INVENTORS.
ANTHONY M. APICELLA, JR.
NORMAN L. BOLING
JOHN T. FRANKS, JR.
BY [signature]
ATTORNEY Sept. 2, 1969 A. M. APICELLA, JR., ET AL 3,465,318

EXTERNALLY BIASED HIGH SPEED NON-DESTRUCTIVE MEMORY ELEMENT

Filed Aug. 6, 1964 3 Sheets-Sheet 2

INVENTORS.
ANTHONY M. APICELLA, JR.
NORMAN L. BOLING
JOHN T. FRANKS, JR.

S.H. Oldham

ATTORNEY

CHARACTERISTICS OF CORES OF VARIOUS SIZES AND MATERIALS

| CORE | SIZE (MILS) | CLEAR/WRITE CURRENT (AMP)* | SWITCHING TIME (DESTRUCTIVE MODE) $t_s$ (USEC) | | NONDESTRUCTIVE READOUT (MV)+ | |
|---|---|---|---|---|---|---|
| | | | $H_E = 0$ | $H_E = 85$ | $H_E = 0$ | $H_E = 85$ |
| 1. EMI 31-101 | 30 BY 18 BY 7.5 | 0.470 | 0.4 | 0.18 | 7 | 18 |
| 2. EMI 31-110 | 30 BY 18 BY 7.5 | 0.180 | 1. | 0.5 | 5 | 12 |
| 3. GENERAL CERAMICS MC-177 | 30 BY 18 BY 7.5 | 0.565 | 0.3 | 0.18 | 6 | 18 |
| 4. GENERAL CERAMICS MC-147 | 50 BY 30 BY 15 | 0.33 | 1.75 | 0.7 | 9 | 27 |
| 5. GENERAL CERAMICS MC-138 | 50 BY 30 BY 15 | 0.565 | 1. | 0.4 | 8 | 28 |
| 6. AMPEX 501-07 | 50 BY 30 BY 15 | 0.560 | 0.52 | 0.27 | 8 | 26 |
| 7. EMI 54-102 LITHIUM FERRITE | 50 BY 30 BY 15 | 0.675 | 1. | 0.4 | 6 | 28 |
| 8. GENERAL CERAMICS MC-113 | 80 BY 50 BY 25 | 0.900 | 1. | 0.4 | 9 | 42 |
| 9. GENERAL CERAMICS MC-113 (GROUND TO 0.005-IN. THICK) | 80 BY 50 BY 5 | 0.900 | 1. | 0.4 | 11 | 26‡ |
| 10. GENERAL CERAMICS MC-119 | 80 BY 50 BY 25 | 0.450 | 3.5 | 1.3 | 8 | 42 |
| 11. GENERAL CERAMICS MC-151 | 80 BY 50 BY 25 | 0.450 | 3.0 | 1. | 10 | 45 |

* CURRENT WAS 12 PERCENT HIGHER THAN SPECIFIED BY MANUFACTURER.
+ INTERROGATE CURRENT WAS 1.0 AMP TURNS; PULSE RISE-TIME WAS 15 NSEC.
‡ THIS CORE WAS NOT OPERABLE AT 85 OERSTEDS; A FIELD OF 60 OERSTEDS WAS USED.

FIG-6

INVENTORS.
ANTHONY M. APICELLA, JR.
NORMAN L. BOLING
JOHN T. FRANKS, JR.
[signature]
ATTORNEY United States Patent Office 3,465,318

Patented Sept. 2, 1969

3,465,318

EXTERNALLY BIASED HIGH SPEED NON-DESTRUCTIVE MEMORY ELEMENT

Anthony M. Apicella, Jr., Massillon, Norman L. Boling, Cuyahoga Falls, and John T. Franks, Jr., Akron, Ohio, assignors to Goodyear Aerospace Corporation, Akron, Ohio, a corporation of Delaware Filed Aug. 6, 1964, Ser. No. 387,824
Int. Cl. G11b *5/00*
U.S. Cl. 340—174 1 Claim

ABSTRACT OF THE DISCLOSURE

This invention relates to an externally biased high speed non-destructive memory element, and more particularly to a substantially conventional square looped magnetic material in a single apertured closed geometry core utilizing substantially conventional cross field switching techniques under the influence of an external magnetic field to substantially increase the magnitude of non-destructive core outputs for a given interrogation field strength and substantially decrease the time requirements for output signals for destructive switching of the core.

Heretofore, the use of standard toroidal cores in digital memory storage systems has been well known. Further, the technique of cross field switching to achieve a non-destructive readout of the information stored in the core has been well known. However, these prior art techniques have required high power or current requirements to obtain output information utilizing the cross field switching technique, which high power requirements have led to low signal to noise ratios and consequently very little real applicability of the system because of these disadvantages. However, a successful system utilizing cross field switching which can achieve a sufficient signal output with a high signal to noise ratio can give a considerable advancement to the state of the art. A system of this type is needed.

It is the general object of the present invention to avoid and overcome the foregoing and other objections of prior art practices, and to meet the needs of the art by providing a non-destructive memory element which is externally biased by a magnetic field to achieve a considerably greater sense signal output upon a given amount of current applied in an interrogate signal input.

A further object of the invention is to provide a non-destructive memory element which is less current-sensitive and has a much wider temperature range than most core elements.

A further object of the invention is to provide a non-destructive toroidal core memory element which utilizes cross field switching techniques to achieve a greatly simplified array winding problem with the corresponding decrease in array size and cost.

A further object of the invention is to provide a destructive memory element capable of providing output information utilizing conventional switching techniques where an external magnetic bias substantially decreases the time requirement to write and readout information.

The aforesaid objects of the invention and other objects which will become apparent as the description proceeds are achieved by providing in an externally biased high speed non-destructive memory element the combination of a magnetic core having an axis and a single flux path therearound, means to produce a flux path in a desired direction around the core, means to produce non-toroidal magnetic field perpendicular to the axis of the core, means to create an interrogate magnetic field around the core in a plane substantially parallel to the non-toroidal magnetic field, and means to sense flux changes in the core along a plane substantially perpendicular to the interrogate magnetic field.

For a better understanding of the invention, reference should be had to the accompanying drawings wherein:

FIGURE 6 is a table showing the properties of several conventional cores when subjected to the principles of the invention.

Figures 1, 2:
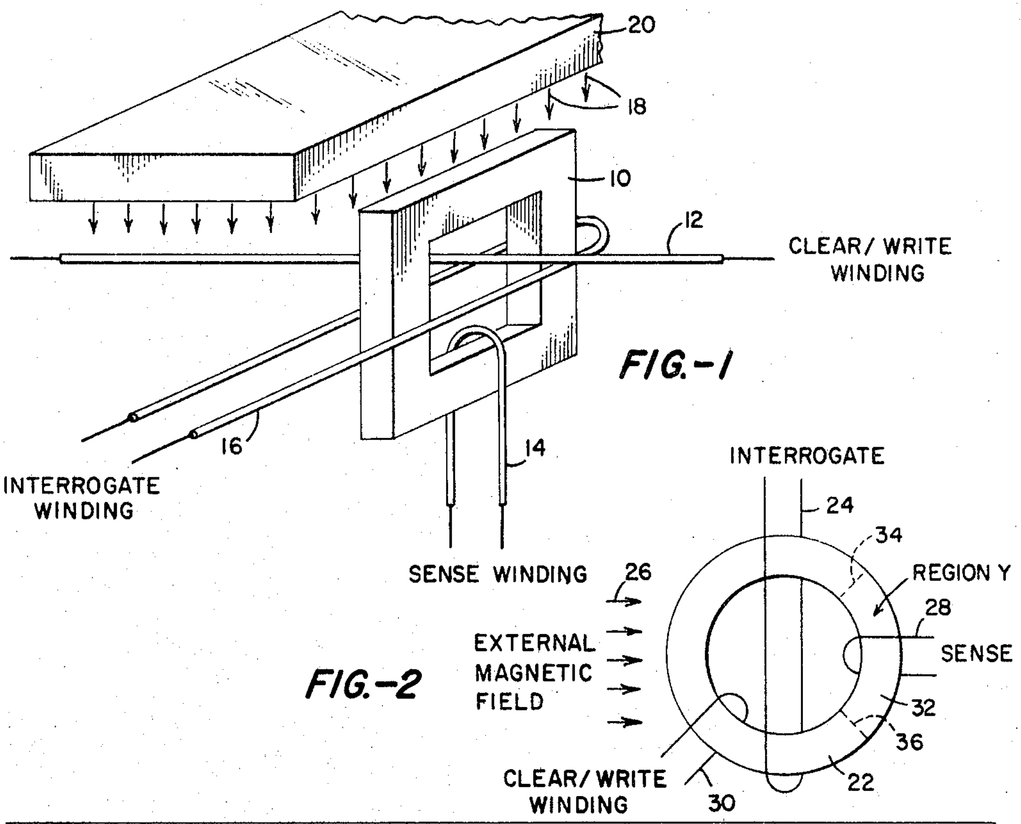
FIGURE 1 is an enlarged perspective view of a single square shaped memory element which has associated therewith an external non-toroidal magnetic field which acts as a bias to increase the strength of signals induced on the sense winding by current input pulses on the interrogate winding.
FIGURE 2 is a plan view of a toroidal magnetic core incorporating the embodiments of the invention.

With reference to the form of the invention illustrated in FIGURE 1 of the drawings, the numeral 10 indicates generally a square shaped magnetic core having a closed flux path around its four legs. In order to set a desired flux path around the legs of the core 10, a suitable clear/write winding 12 is passed therethrough. The other normal windings for a conventional core set up utilizing cross field switching techniques include a sense winding 14 passed through the core and an interrogate winding 16 passed around the core in a solenoidal fashion. It is important that the sense winding 14 be essentially perpendicular to the plane of the interrogate winding 16.

In order to achieve the desired objects of the invention, an externally applied non-toroidal field, indicated generally by the plurality of arrows 18 is provided by a permanent magnet 20. Any other suitable means to apply the field 18 could be utilized. The positioning of the magnet 20 is important, as it must lie essentially parallel to the axis of the core and parallel to the plane of the interrogate winding 16 so the field 18 is perpendicular to the axis of the core. The actual spacing of the magnet 20 from the core 18 is not of critical importance, nor is the strength of the field 18 supplied by the magnet 20, as will be more fully explained hereinafter. In fact, the magnet 20 may contact the core 18. Since the magnet 20 has such low permeability, contact with the core 18 will not cause any deviation of the core flux pattern.

FIGURE 2 illustrates a simple toroidal core 22 in a cross field switching mode as determined by the solenoidal type wrapping of an interrogate winding 24, which is under the influence of an external magnetic field 26 applied perpendicular to the plane of the interrogate winding 24, or in the same manner as the square shaped magnetic element of FIGURE 1. A sense winding 28 is applied perpendicular to the interrogate winding 24 with a clear/write winding 30 passed through the core at any convenient location.

In order to more clearly determine the flux changes induced upon a signal pulse through the interrogate winding 24, we should consider only the flux paths through an area called region Y, and indicated by numeral 32, as defined by the dotted lines 34 and 36. This region Y encompasses equal areas on both sides of the sense winding 28, or defines an area of the core 22 essentially perpendicular to the magnetic field generated by a current pulse passed through the interrogate winding 24 and perpendicular to the magnetic field 26. In other words, the sense winding is interested in determining the flux change in an arcuate section of the core which is perpendicular to the magnetic field 26. Thus, a determination of the flux changes in region Y will determine what type of information will be detected by the sense windings 28.

Figure 3:
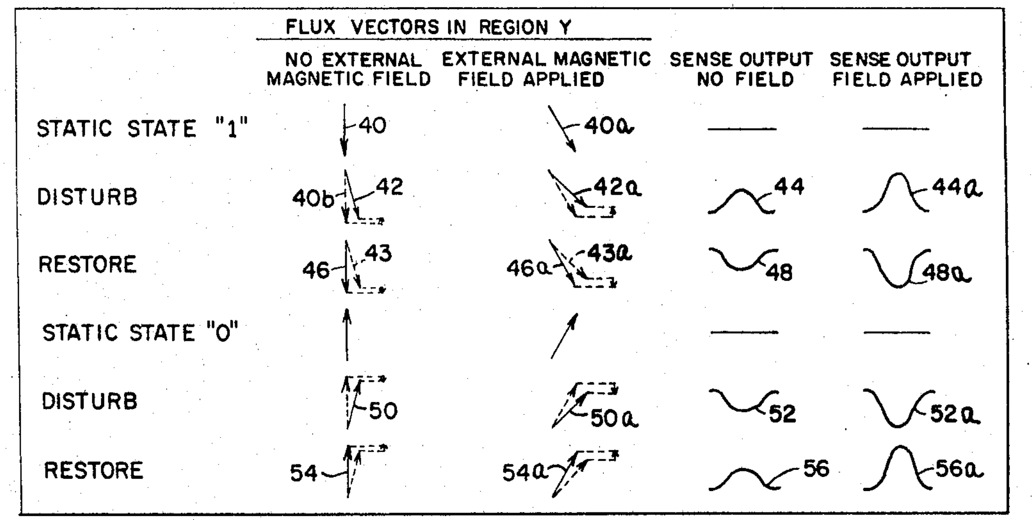
FIGURE 3 is a chart illustrating the changes in region Y of the magnetic core of FIGURE 2 for interrogate pulses introduced thereinto showing the flux changes a detected as current pulses in the sense output winding.

For a better understanding of the signals obtained utilizing either the device of FIGURE 1 or FIGURE 2, reference should be had to FIGURE 3. For the purposes of providing a base, we will assume that the core is in a clockwise state of magnetization or a static state 1, as defined by the write winding. For these purposes, with reference to FIGURE 2, the flux pattern passing through region Y will be in a generally downward or vertically downward direction as indicated by vector arrow 40 in FIGURE 3. However, with the external magnetic field 26 applied, this vector 40 will be moved slightly counter-clockwise as shown by the adjacent vector **40*a*. As a signal pulse is applied through the interrogate winding 24, it creates an orthogonal interrogating magnetic field which disturbs the state 1 magnetization from its rest position in such a way as to tend to cause alignment thereof with the interrogating field as indicated by vector 42 moved counter-clockwise away from the at rest position indicated by the dotted lines 40*b*. The vector 40*a* likewise moves counter-clockwise to position 42*a*. Generally the amount of flux rotation will be small, in the order of less than one degree for a 300 milliamp field applied to a standard toroidal core, because of the high anisotropy of the original clockwise magnetic field. During the rise time, or change of rotation of the vector pulses 42 and 42*a* more fully indicated by a change in direction in the flux path through the core, the sense winding sees a change in the flux threading through region Y which causes positive voltage pulses 44 and 44*a* to be generated on the sense winding. When the current pulse through the interrogating winding has passed, the rate of change of the magnetic field applied by the interrogating field goes to zero, as indicated by flux vectors 46 and 46*a* which are in the same position as the initial flux vectors 40 and 40*a*, having shifted from their previous position determined by the interrogating field as indicated by the dotted lines 43 and 43*a*. Of course, this causes the flux path through the region Y of the core 22 to be shifted back to its initial static state 1 position thereby completing a non-destructive readout. This returning shift of the flux vector in region Y to its initial position likewise causes the sense winding to see a change in the flux threading through it, however, this time negative voltage pulses 48 and 48*a*** are generated.

The bottom half of FIGURE 3 illustrates the same phenomena for a static state 0, described above with reference to a static state 1. The same results occur when the disturb state induced by the interrogate pulse creating an interrogating magnetic field shifts flux vectors 50 and **50*a* to the right causing a downward change in the flux pattern in region Y which induces negative voltage pulses 52 and 52*a* into the sense winding. Conversely, when the interrogating field is removed, the shift of flux vectors 50 and 50*a* are restored as indicated by flux vectors 54 and 54*a* which causes an upward shift in the flux pattern passing through region Y to induce positive voltage pulses 56 and 56*a*** into the sense winding.

Thus, in summary it can be seen with reference to FIGURE 3 that if the core 22 is in the static state 1, a positive voltage is induced on the sense winding during the field rise time, whereas if it is in the zero state a negative voltage is induced. This occurs because in the former case the flux is being changed to a more positive state than its static state and in the latter case the flux is being changed to a more negative state than in its static state. It should also be noted that the voltages **44*a*, 48*a*, 52*a* and 56*a* are of considerably greater magnitude than the voltages 44, 48, 52 and 56**. This is because of the external magnetic field bias and will be more fully explained hereinafter.

Figure 4:
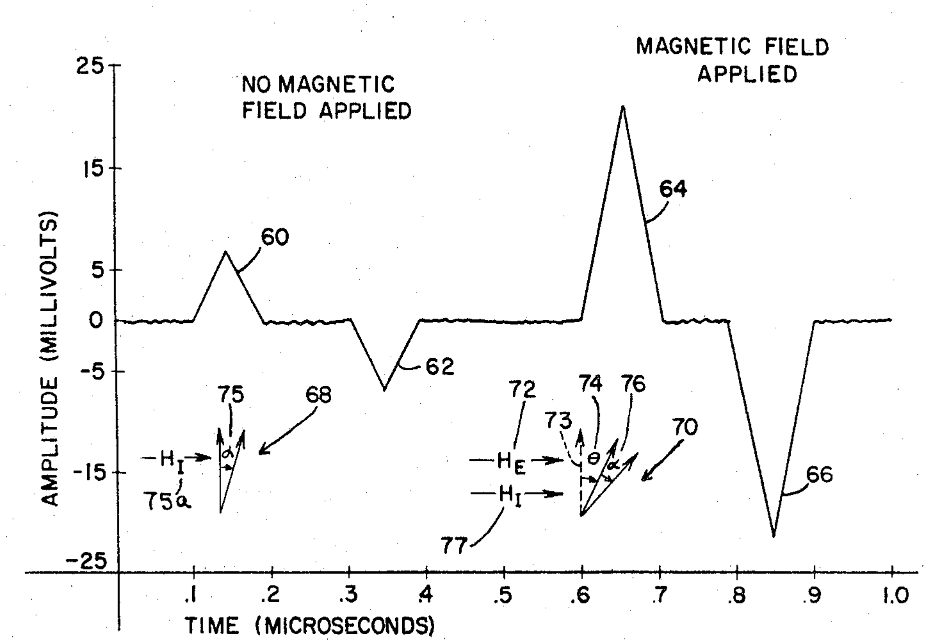
FIGURE 4 is a graphical illustration of the change in strength of signal output for a memory element of FIGURE 1 or FIGURE 2 showing comparatively the signal output with and without a magnetic field applied.

For a graphic illustration of the bias effect of the external magnetic field, reference should be had to FIGURE 4 illustrating a typical case which shows that positive and negative signal pulses 60 and 62, respectively, induced into a sense winding by a cross field interrogating pulse, as described above, induces voltages of approximately 7 millivolts into the sense winding with no magnetic field applied for a bias effect. Whereas, with an external magnetic field applied, as indicated on the right hand side of FIGURE 4, positive and negative volt pulses 64 and 66, respectively, as determined by the cross field switching techniques described above, with the magnetic field applied, are in the neighborhood of 21 millivolts positive or negative. In other words, these voltage pulses 64 and 66 are at least about 3 times the magnitude of the voltage pulses 60 and 62 with no magnetic field applied. This biasing effect of the magnetic field means that smaller currents can be used for the interrogation pulses resulting in the same signal output with a much greater signal to noise ratio.

The vector diagrams indicated generally by numerals 68 and 70 in FIGURE 4 clearly show the reason for the greater signal output where external magnetic bias is applied. The external magnetic field designated by letter $H_E$ and identified by numeral 72 rotates what in this case is an upwardly directed flux vector 73 in region Y of the core of FIGURE 2 to the right or clockwise an angle $\theta$, indicated by numeral 74. The application of the interrogate field causes the flux vector to be rotated from its rest position as designated by numeral 75 in diagram 68 and numeral 76 in diagram 70.

In diagram 68 the amount of voltage induced into the sense wire by the interrogate field $H_I$, designated by numeral **75*a***, is proportional to the change in the vertical component of the magnetization flux vector. This can be expressed by the equation $$V_s = K\frac{d}{dt}\phi_t(1-\cos\alpha)$$

for diagram 68 where K is a constant, $t$ is the rise time of the current pulse, $V_s$ is the signal induced in the sense winding, and $\phi$ is the total available flux.

In diagram 70 of FIGURE 4, where a static externally applied interrogate field $H_I$ designated by numeral 77 is rotating the magnetization vector from its rest position, the signal induced on the sense line by the application of an interrogate field can be expressed $$V_s' = K\frac{d}{dt}\phi_t(\cos\theta - [\cos(\theta+\alpha)])$$

where $\theta$ is the angle the magnetization is rotated by the external field $H_E$. It can be shown that the expression $[\cos\theta - \cos(\theta+\alpha)]$ always will be larger than $1-\cos\alpha$, provided $\alpha$ is greater than 0. The maximum value of $V_s$ occurs for a given $\alpha$ when $$\tan\theta = \frac{\sin\alpha}{1-\cos\alpha}$$

Thus, it is seen that the rotation $\theta$ applied by the external magnetic field $H_E$ allows the output signal to take advantage of the increase in the cosine curve as it moves away from 0° to 90°. It should be understood that for small values of $\alpha$ the optimum value of $\theta$ is 90 deg. At 90 deg. the slope of the cosine curve reaches a maximum. The optimum value of $\theta$ for an $\alpha$ of 2 deg. is 89 deg. The increase in signal can be expressed as the ratio of $$\frac{V_s'}{V_s} = \left[\frac{\cos\theta - \cos(\theta+\alpha)}{(1-\cos\alpha)}\right]$$

The gain in signal output for the optimum values of $\theta$ with an $\alpha$ of 2 deg. would be approximately 1500. These large increases in signal cannot be achieved because of the effect of the externally applied magnetic field on the state of the magnetization of the core. The relatively high permeability ($u=10$) of the conventional core presents a low reluctance path to the externally applied field. This causes some of the flux in the core to become aligned with the external applied field. The flux that is aligned by the external magnetic field is unavailable for use in either cross field or full switching of the core. The first area of the core affected by the external field is that closest to the outside diameter of the core. As the external field is increased, the area moves in toward the inner diameter of the core until the entire flux of the core is "locked up" by the external field. All the computer-type ferrite cores that have been investigated have had a permeability of approximately 10 in this direction. Further, the permeability is linear and independent of the external field exactly as it is in the hard direction of a thin film. Because of this reduction in available flux, the equation to obtain $V_s'$ must be modified as $$V_s'=K\frac{d}{dt}(\phi_t-\mu H_E)[\cos\theta-\cos(\theta+\alpha)]$$

and the ratio (R) of the signal induced on the sense line with a magnetic field to that with no magnetic field applied becomes $$R=\frac{V_s'}{V_s}=\left(\frac{\phi_t-\mu H_E}{\phi_t}\right)\left[\frac{\cos\theta-\cos(\theta+\alpha)}{1-\cos\alpha}\right]$$

Calculations made using the above equation to find R agree with the experimental data within 3 percent. Over the range of field intensity between 50 and 100 oersteds, the output signal varies by 5 percent.

Experimentation has found that the rotation $\theta$ caused by the external magnetic field $H_E$ will be about 1° for every 7 oersteds. Generally, in order to achieve the objects of the invention, the ratio of rotation caused by $H_E$ compared to that caused by $H_I$ will be about 10 to 1. In some cases the rotation caused by $H_I$ might be equal to the rotation caused by $H_E$, while the top limit on a $H_E/H_I$ ratio might be about 50/1.

An externally applied magnetic field also locks up at least a part of the flux of a core beginning at the outer diameter thereof so that the core appears to have a smaller cross sectional area. However, because the flux around the inner diameter of the core is unaffected, the threshold field required for initiating switching remains the same. Thus, the effective appearance of the core is that of one with a thinner wall where the material is removed from the outer diameter. When a core is fully switched from one remanent state to another in the normal domain-wall switching of a computer core, switching begins at the inner diameter of the core and proceeds along the wall to the outer diameter. Because of the limited velocity at which domain walls are able to move, this process takes a finite amount of time for a finite thickness of core build-up. The smaller the ratio of outer diameter to inner diameter, the faster a core can be switched from one state to the other. In other words, since an externally applied magnetic field partially locks up the outer flux layers in a core, the core is able to switch in an appreciably shorter time.

Figure 5:
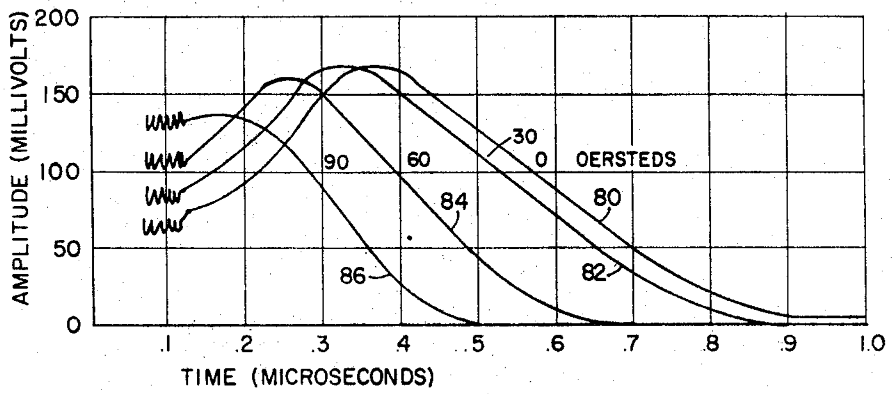
FIGURE 5 is a graphical illustration of the decreased time requirement necessary for destructive signal write and readout because of the use of the external magnetic field acting as a bias.

FIGURE 5 illustrates the decreased switching times resultant for essentially the same threshold switching current with the application of various strength external non-toroidal magnetic fields. Curve 80 which shows a core switching in 1 microsecond has no external magnetic field. Curve 82, which shows switching occurring in about .8 microsecond, has an external magnetic field of 30 oersteds. Curves 84 and 86, which shows switching occurring in about .6 and .4 microsecond, respectively, have external magnetic fields of 60 and 90 oersteds, respectively.

Many different core materials and core sizes have been tested for the above mentioned phenomena, namely, increased signal output, increased signal to noise ratio, and decreased switching time. The data represented by the table of FIGURE 6 for eleven such cores clearly illustrates these phenomena when the core is in the external nontoroidal field, compared to when it is not in the field. This table clearly shows the improvements resulting in subjecting the core to an external non-toroidal magnetic field, using cross field switching techniques and sensing the core perpendicular to the interrogation pulse field. The positioning of the magnet relative to the core should be such as to provide a non-toroidal magnetic field of between about 25 to about 100 oersteds at the core. A field anywhere in this range will substantially provide the objects of the invention for a standard computer memory core. However, for cores with other geometrics the range of the non-axial field probably will be different.

Further, although the principles disclosed herein have been illustrated and described only with reference to single aperture devices, the principles may be generally applicable to multi-aperture devices. Although the external non-toroidal magnetic field has been illustrated as supplied by a permanent magnet, this field may be supplied by a current applied either to the interrogate winding on via another current carrying conductor. In other words this external field may be either static or dynamic.

Thus, it is seen that the objects of the invention have been achieved by providing a magnetic core having a single closed flux path which utilizes cross field switching techniques with an external bias supplied by a magnetic field. The external bias effectively amplifies the output voltages detected by a sense winding which are resultant from an input interrogation magnetic field which surrounds the core on a plane substantially perpendicular to the plane of the external magnetic field. The destructive switching time is also substantially decreased. As shown in FIGURE 6, these phenomena are resultant when applied to eleven of the magnetic cores currently utilized by the computer industry. Thus, the same voltage signal output is achieved with less current input on the interrogate winding thereby achieving a higher signal to noise ratio for a much more efficient non-destructive readout. It might be stated that the reason the external magnetic field acts as an amplifier to increase the signal output would be as follows:

The field offsets the flux pattern in the arcuate portion of the core perpendicular to the force of the magnetic field. This places the flux pattern on a more inclined portion of the cosine curve so that the further offsetting effect of the flux pattern by the interrogate field will provide a greater vertical change to the flux pattern, thereby providing a greater voltage output on the sensing wire.

While in accordance with the patent statutes only one best known embodiment of the invention is illustrated and described in detail, it is to be particularly understood that the invention is not limited thereto or thereby, but that the inventive scope is defined in the appended claim.

What is claimed is:

1. An apparatus with a magnetic core using external magnetic bias to decrease switching time which includes a planar magnetic sheet having a uniform magnetic field extending normal to the surface thereof, a magnetic core having an axis and a single flux path therearound positioned so that the axis of the core is substantially parallel to the plane of the magnetic sheet and one section of the flux path of the core is adjacent to the sheet and substantially perpendicular to the flux emanating uniformly in a normal direction from the sheet, the core being positioned at a distance so as to provide the uniformly distributed magnetic field of between 25 to about 100 oersteds at the section of the flux path of the core adjacent to the magnetic sheet, the magnetic sheet having permeability, and the core being made from closed loop magnetic permeable material, a write winding passing through the core to create a flux path therearound in a desired direction by domain wall switching upon the passage of a high magnitude current pulse through the write winding, means to create an interrogate magnetic field around the core in a plane substantially parallel to the magnetic field extending normal to the magnetic sheet which field is about $1/10$ as great as the magnetic field of the planar magnetic sheet, and means to sense flux changes in the core which occur along that section of the flux path of the core positioned adjacent to the sheet.

References Cited

UNITED STATES PATENTS 3,214,741 10/1965 Tillman ------------ 340—174

3,287,712 11/1966 Hewitt ------------ 340—174
3,295,115 12/1966 Synder ------------ 340—174

FOREIGN PATENTS 965,596 8/1964 Great Britain.
875,388 8/1961 Great Britain.

BERNARD KONICK, Primary Examiner

VINCENT P. CANNEY, Assistant Examiner